US012574231B2

(12) United States Patent
Mruthyunjaya et al.

(10) Patent No.: US 12,574,231 B2
(45) Date of Patent: Mar. 10, 2026

(54) ENCRYPTION-BASED SYSTEM-ON-CHIP (SoC) FEATURE ENABLEMENT

(71) Applicant: QUALCOMM INCORPORATED, San Diego, CA (US)

(72) Inventors: Vardhana Mruthyunjaya, Mangalore (IN); Vasista Ati, Bangalore (IN); Kota Subba Rao Sajja, Bengaluru (IN); Ashish Mishra, Bhubaneswar (IN)

(73) Assignee: Qualcomm Incorporated, San Diego, CA (US)

( * ) Notice: Subject to any disclaimer, the term of this patent is extended or adjusted under 35 U.S.C. 154(b) by 56 days.

(21) Appl. No.: 18/653,863

(22) Filed: May 2, 2024

(65) Prior Publication Data

US 2025/0343688 A1 Nov. 6, 2025

(51) Int. Cl.
H04L 9/08 (2006.01)
G06F 9/4401 (2018.01)

(52) U.S. Cl.
CPC ............ H04L 9/088 (2013.01); G06F 9/4401 (2013.01)

(58) Field of Classification Search
CPC .............................. H04L 9/088; G06F 9/4401
See application file for complete search history.

(56) References Cited

U.S. PATENT DOCUMENTS

| | | | |
|---|---|---|---|
| 2014/0164725 A1* | 6/2014 | Jang | G06F 21/575 |
| | | | 710/316 |
| 2014/0164753 A1* | 6/2014 | Lee | G06F 21/575 |
| | | | 713/2 |
| 2014/0310536 A1* | 10/2014 | Shacham | G06F 21/78 |
| | | | 713/193 |
| 2019/0347213 A1* | 11/2019 | Lutz | G06F 21/602 |

* cited by examiner

*Primary Examiner* — Mohammad W Reza
(74) *Attorney, Agent, or Firm* — Smith Tempel Blaha LLC

(57) ABSTRACT

Encrypted configuration information may be used to enable features of a system-on-chip (SoC). Encrypted information may be read from SoC firmware during SoC booting. The encrypted information may be decrypted by feature enablement circuitry in the SoC, and feature enablement signals resulting from the decryption may be provided to core logic circuitry of the SoC.

12 Claims, 7 Drawing Sheets

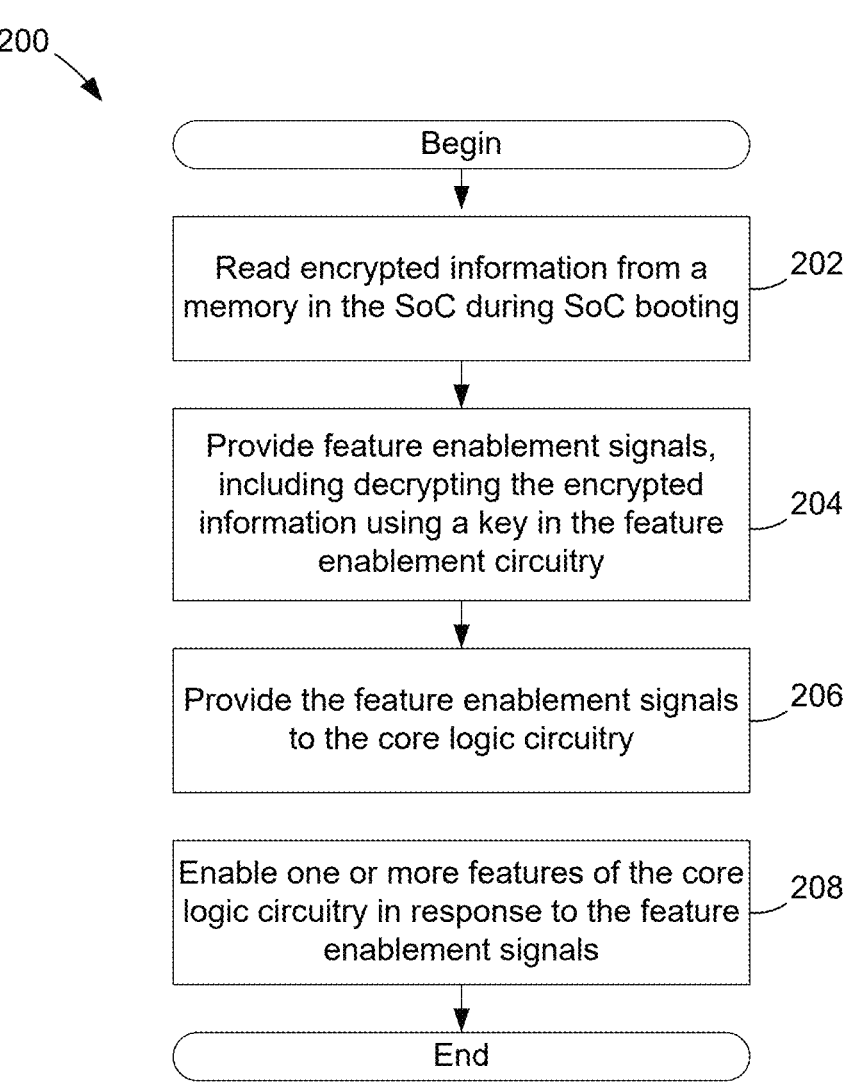

200

Begin

Read encrypted information from a memory in the SoC during SoC booting — 202

Provide feature enablement signals, including decrypting the encrypted information using a key in the feature enablement circuitry — 204

Provide the feature enablement signals to the core logic circuitry — 206

Enable one or more features of the core logic circuitry in response to the feature enablement signals — 208

End

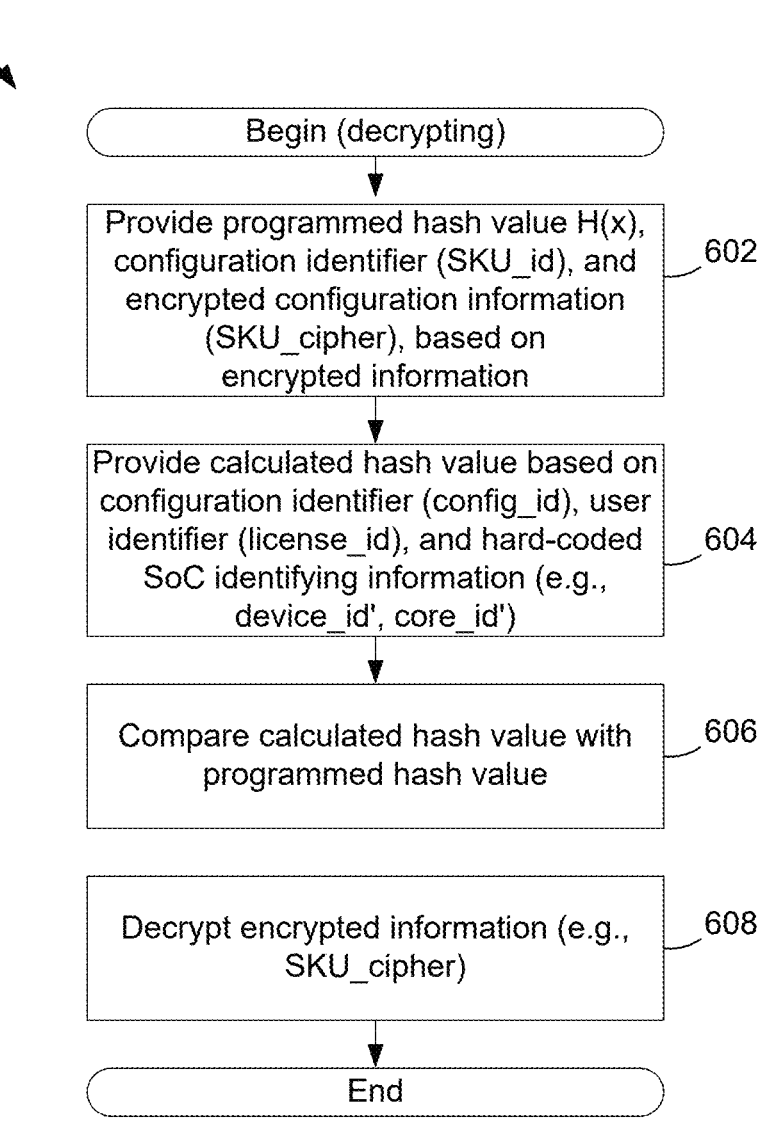

Begin (decrypting)

Provide programmed hash value H(x), configuration identifier (SKU_id), and encrypted configuration information (SKU_cipher), based on encrypted information — 602

Provide calculated hash value based on configuration identifier (config_id), user identifier (license_id), and hard-coded SoC identifying information (e.g., device_id', core_id') — 604

Compare calculated hash value with programmed hash value — 606

Decrypt encrypted information (e.g., SKU_cipher) — 608

End

FIG. 6

ENCRYPTION-BASED SYSTEM-ON-CHIP (SoC) FEATURE ENABLEMENT

DESCRIPTION OF THE RELATED ART

A computing device may include multiple processing subsystems, such as central processing units (CPUs), graphics processing units (GPUs), digital signal processors (DSPs), and neural processing units (NPUs). Wireless computing devices may also include radio transceiver subsystems. The multiple processors or subsystems may be integrated on a "system-on-chip" (SoC). Cellular handsets, tablets, automotive computing devices, so-called Internet-of-Things (IoT) devices, and wearable devices are just a few examples of computing devices that may include SoCs.

Computing device manufacturers, which may also be referred to as original equipment manufacturers (OEMs), may use the same SoC configured in different ways to offer devices (i.e., products) with different combinations of features or different grades of similar features. For example, a first OEM may produce a smartphone containing an SoC that provides a high-resolution video capture feature and an advanced video encoding feature, while a second OEM may produce a smartphone containing the same SoC that provides lower-resolution video capture but also provides the advanced video-encoding feature. The SoC may be capable of providing any combination of these features by selectively "enabling" the features before the end-user begins using the device. That is, the difference lies not in the SoC's architecture but in which features have been enabled.

An SoC provider may use programmable fuses to enable a particular combination of features to suit a particular OEM's requirements. An SoC may contain an array of fuses, which are one-time programmable hardware elements (e.g., metal or silicon traces). By selectively disabling (colloquially referred to as "blowing") a particular combination of fuses, the SoC can be programmed or configured with a corresponding combination of features in an essentially irreversible manner. The fuse array thus serves as a read-only form of memory to store the feature configuration. When the SoC is booted, the feature configuration encoded in the fuse array may be read and used to enable or disable SoC features. The one-time programmable hardware nature of such fuses provides security against subsequent attempts to alter the configuration.

Disadvantages of using fuses to program an SoC feature configuration may include, for example, the cost of the fuse array in SoC production, the time required to blow the fuses and test the result, the possibility of blowing incorrect fuses, aging effects on the fuse array, etc. Improvements in configuring SoCs with different combinations of features may be desirable.

SUMMARY OF THE DISCLOSURE

Systems, methods, and other examples of enabling features of SoCs having selectably enablable features are disclosed.

An exemplary method for enabling features of an SoC may include reading, by control circuitry of the SoC, encrypted information from a memory in the SoC during SoC booting. The method may also include providing, by feature enablement circuitry of the SoC, feature enablement signals. Providing the feature enablement signals may include decrypting the encrypted information. The method may further include providing the feature enablement signals to core logic circuitry of the SoC.

A system for enabling features of an SoC may include control circuitry and feature enablement circuitry in the SoC. The control circuitry may be configured to read encrypted information from a memory in the SoC during SoC booting. The feature enablement circuitry may be configured to decrypt the encrypted information and provide feature enablement signals to core logic circuitry of the SoC.

Another exemplary system for enabling features of an SoC may include means for reading encrypted information from a memory in the SoC during SoC booting. The system may also include means for providing feature enablement signals. The means for providing the feature enablement signals may include means for decrypting the encrypted information based on a hard-wired key. The system may further include means for providing the feature enablement signals to core logic circuitry of the SoC.

BRIEF DESCRIPTION OF THE DRAWINGS

In the Figures, like reference numerals refer to like parts throughout the various views unless otherwise indicated. For reference numerals with letter character designations such as "101A" or "101B", the letter character designations may differentiate two like parts or elements present in the same Figure. Letter character designations for reference numerals may be omitted when it is intended that a reference numeral encompass all parts having the same reference numeral in all Figures.

FIG. 2 is a flow diagram illustrating a method for enabling SoC features, in accordance with exemplary embodiments.

FIG. 6 is a flow diagram illustrating aspects of a decryption method, in accordance with exemplary embodiments.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
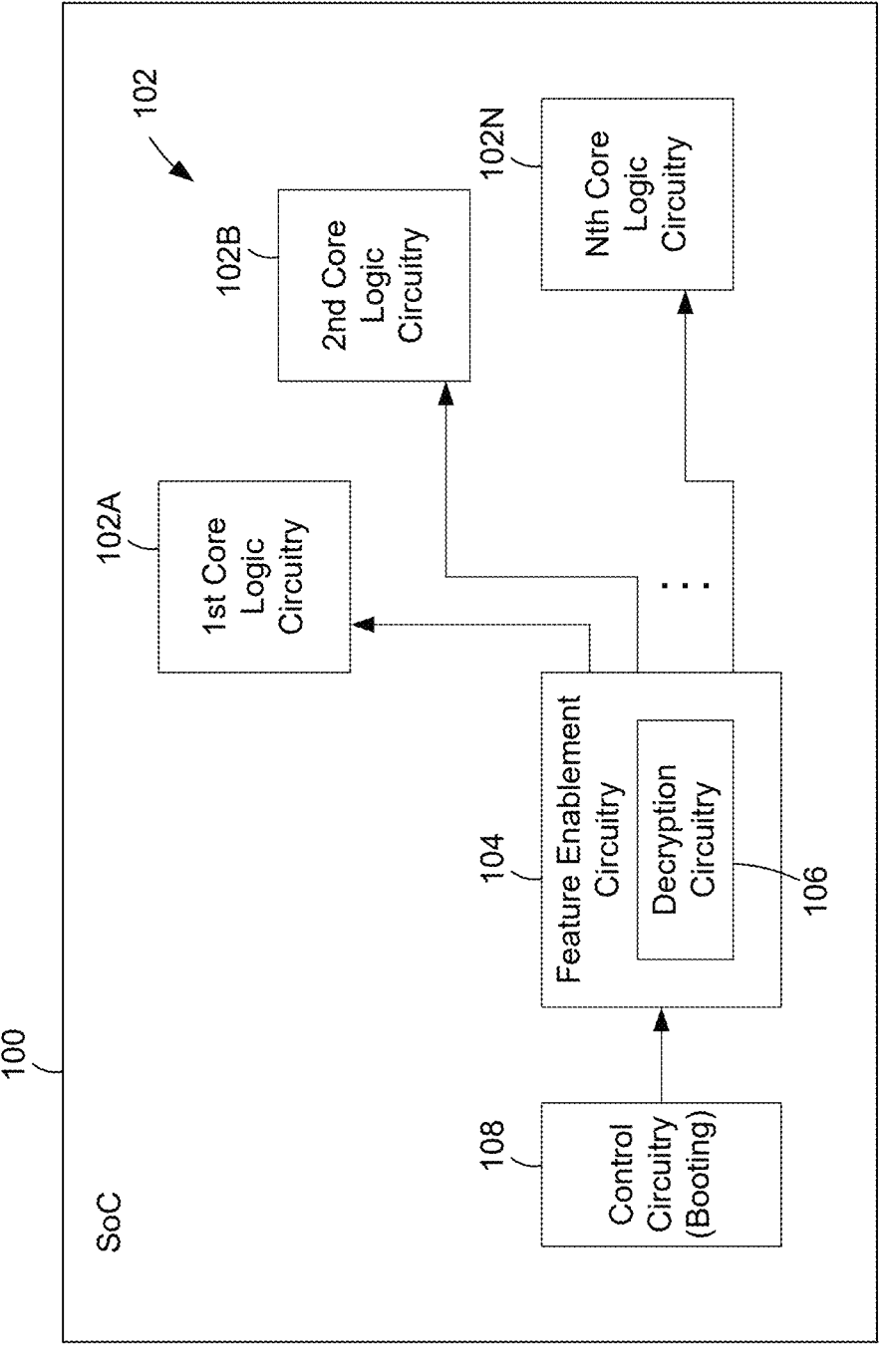
FIG. 1 is a block diagram of a system-on-chip (SoC) having core logic circuitry with selectably enablable features, in accordance with exemplary embodiments.

As shown in FIG. 1, in an illustrative or exemplary embodiment a system-on-chip (SoC) 100 may include any number of core logic circuitry blocks 102, such as a first core logic circuitry block 102A, a second core logic circuitry block 102B, etc., through an Nth core logic circuitry block 102N. The core logic circuitry blocks 102 may be of various types and may include, for example, a central processing unit (CPU), a graphics processing unit (GPU), a wireless transceiver subsystem (also referred to as a modem), etc. Each core logic circuitry block 102 may have one or more features that can be selectively enabled or disabled. The SoC 100 may include feature enablement circuitry 104 that may enable a selected first subset of the features and disable a selected second subset of the features. The feature enablement circuitry 104 may perform this feature enablement when the SoC 100 is booted or otherwise before the SoC 100 begins normal or so-called mission-mode operation. (The term "mission-mode" refers to a state of operation or use of a computing device (not shown in FIG. 1) by an end-user.) Control circuitry 108 associated with booting of the SoC 100 may trigger or otherwise enable the feature enablement circuitry 104 to begin the feature enablement. The feature enablement circuitry 104 may then securely maintain all features in the selected enabled or disabled state during subsequent mission-mode operation of the SoC 100. Security may be provided by decryption circuitry 106 of the feature enablement circuitry 104 in a manner described below. In another security-related aspect, it should be noted that the features to which the solutions described herein apply can only be enabled by the feature enablement circuitry 104; the features cannot be enabled by software executing on an SoC CPU, for example.

The above-referenced selectably enablable features may more generally be referred to as SoC features. The term "configuration" may be used to refer to the set of all SoC features, in which a first subset thereof consists of enabled features and a second subset thereof consists of disabled features.

An entity that is the source of the SoC 100, such as an SoC manufacturer or other SoC provider, may desire to provide the SoC 100 in different configurations to suit the demands of the entity's customers, which may be manufacturers or other providers of computing devices that include the SoC 100 as a component. Such manufacturers or providers are commonly referred to as original equipment manufacturers or "OEM"s. For example, a first OEM may desire to provide a computing device in which all SoC features are enabled, while a second OEM may desire to provide a different computing device in which fewer than all SoC features are enabled. Or, for example, a first OEM may desire to provide a device in which a first encoding protocol is enabled and a second encoding protocol is disabled, while a second OEM may desire to provide a device in which the second encoding protocol is enabled and the first encoding protocol is disabled. An encoding (e.g., video encoding) protocol is mentioned here only as an example of a feature. An SoC may have any number (e.g., dozens, hundreds, or thousands) of such features, i.e., each of which can be selectably enabled or disabled.

An SoC provider may offer OEMs or other SoC users a selection of different SoC configurations, analogously to a vendor offering a selection of different products. Vendors have traditionally used the term stock keeping unit or "SKU" to refer to a unique identifier (e.g., a number or code) associated with each different product offered. The terms "SKU" and "configuration identifier" may be used synonymously herein to refer to a unique identifier associated with each different SoC configuration. In a manner described below, cryptographic circuitry and methods may be used to secure the configuration in the SoC 100 based on the configuration identifier and a user identifier, and in some examples, on additional information. The user identifier may identify the OEM or other SoC user as an authorized user of the configuration. The user identifier may also be referred to as a license identifier, alluding to an example of an arrangement between the SoC provider and an OEM or other SoC user. To the extent the term "license," "licensee," etc., may be used herein, the term is used only for convenience and should not be construed as limited to a legal definition.

In FIG. 2, an exemplary method 200 for enabling SoC features is broadly shown in flow diagram format. As indicated by block 202, the method 200 may include reading encrypted information from a memory in the SoC during SoC booting. For example, the above-described control circuitry 108 (FIG. 1) may initiate reading the encrypted information during SoC booting. SoC booting may be initiated when, for example, an end-user powers up or resets a computing device, or at other times.

As indicated by block 204, the method 200 may also include providing feature enablement signals, which may include decrypting the encrypted information based on a hard-wired key. For example, the above-described decryption circuitry 106 (FIG. 1) of the feature enablement circuitry 104 may decrypt the encrypted information using a key. The key may, for example, be based on inputs that may include a hard-wired key in the feature enablement circuitry 104. The term "hard-wired," "hard-coded," "wired," etc., means that the source of the key is not software but rather hardware (circuitry). A key that is hard-wired in the SoC circuitry may be more secure than a key provided by software (e.g., resistant to tampering). As described below with regard to an example of the decryption circuitry 106, the hard-wired key may provide the basis for further development of a decryption key using a linear feedback shift register.

As indicated by block 206, the method 200 may further include providing the feature enablement signals to core logic circuitry of the SoC. For example, the feature enablement circuitry 104 (FIG. 1) may provide the feature enablement signals to the core logic circuitry 102. As indicated by block 208, the method 200 may still further include enabling one or more features of the core logic circuitry in response to the feature enablement signals. For example, the core logic circuitry 102 (FIG. 1) may enable the one or more features in response to receiving the feature enablement signals from the feature enablement circuitry 104.

Figure 3:
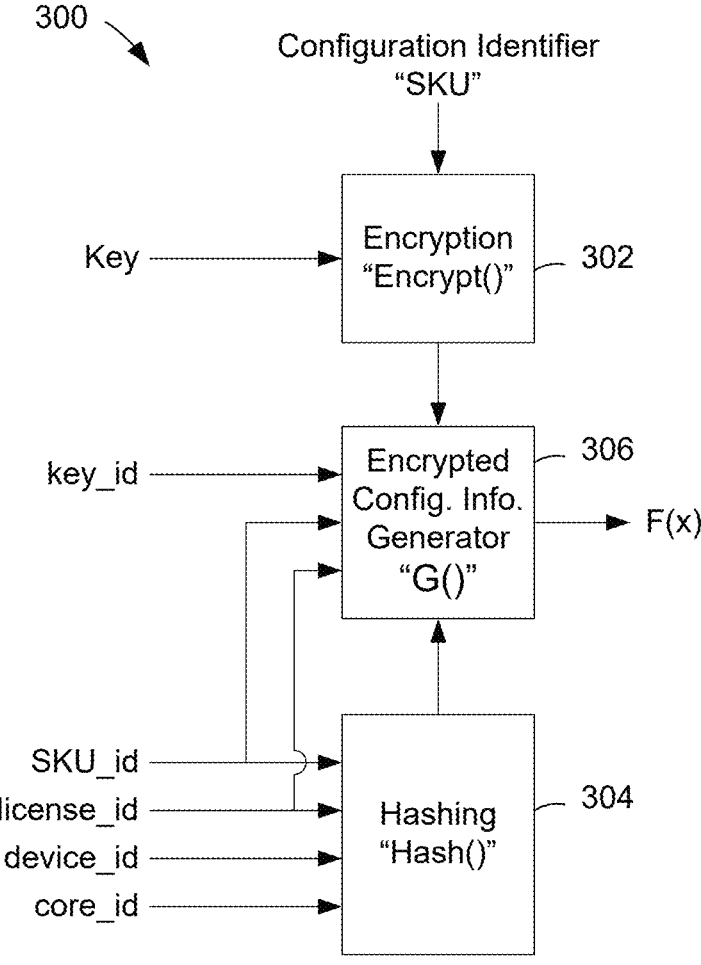
FIG. 3 is a block diagram of a system for encrypting SoC feature configuration information, in accordance with exemplary embodiments.

In FIG. 3, offline logic 300 may be provided separately from the subject SoC (not shown in FIG. 3) and operated "offline," i.e., not contemporaneously with mission-mode operation of the SoC. Rather, the output of the offline logic 300, comprising encrypted configuration information, may be stored in the SoC for later use when the SoC is configured during SoC booting. The encrypted configuration information may comprise a function referred to herein as F(x). Operation of the offline logic 300 may be under the control of the above-referenced SoC provider or other entity. For example, an SoC provider or other entity may operate the encryption logic 300 using a computing device (not shown) executing software.

The offline logic 300 may include encryption logic 302, which may also be referred to as a function Encrypt( ) Throughout the following description, functional logic may be referred to using the common notation of a function name, such as "Encrypt" in the foregoing instance, followed by a pair of parentheses indicating that the function may receive one or more arguments as inputs. The encryption logic 302, thus also referred to as Encrypt( ) may receive as inputs the above-described SKU (configuration identifier) and an encryption key ("Key"). The encryption logic 302 may thus be configured to encrypt the SKU using the encryption key. The encryption key may also be referred to in some examples as an SoC provider key, as an SoC provider may use the same key to conveniently generate encrypted configuration information for any number of different SKUs for any number of different SoC users (or "licensees"). The encryption logic 302 may implement any symmetric key encryption algorithm, such as, for example, Advanced Encryption Standard (AES), variations thereof, etc.

The offline logic 300 may further include hashing logic 304, which may also be referred to as the function Hash( ) In the illustrated example, the hashing logic 304 may receive the following four fixed or constant values as inputs: a SKU identifier (SKU_id), a license identifier (license_id), a device identifier (device_id), and a core identifier (core_id). The SKU identifier uniquely identifies each SKU. That is, each SKU has a unique SKU identifier (e.g., an index number) associated with it. As described above, the license identifier, which may also be referred to as a user identifier, may be uniquely associated with an OEM or other SoC user that is authorized (e.g., by the SoC provider) to use the configuration (SKU) in the SoC. The device identifier uniquely identifies the subject SoC (e.g., the SoC 100 in FIG. 1) that is to receive the configuration. It may be noted that an SoC provider may offer several different SoCs or devices (i.e., differing structurally from each other in ways other than configurations) to OEMs or other SoC users, and the device identifier distinguishes the subject SoC from such other SoCs. The core identifier may uniquely identify a version or group of versions of the SoC (as the structures of one or more of the SoC's various cores may differ among versions of the otherwise "same" SoC). In the illustrated example, the hashing logic 304 is configured to hash these four input values together.

The offline logic 300 may further include encrypted configuration information generator logic 306, which may also be referred to as the "generator" function G( ) The encrypted configuration information generator logic 306 may receive the following inputs: the output of the encryption logic 302 (i.e., the encrypted SKU), the output of the hashing logic 304 (i.e., the hash of the four above-referenced fixed or constant values), the SKU identifier, the license identifier, and a key identifier (key_id). The key identifier may be used to enhance security, in a manner described below. Nevertheless, in other examples the key identifier may be omitted, as also described below. The configuration information generator logic 306 or generator function G( ) may be configured to provide the above-described encrypted configuration information or function F(x) as an output. The function G( ) may be any function that is reversible in nature, i.e., an inverse function G'( ) can retrieve the key identifier (key_id), the SKU identifier (SKU_id), the license identifier (license_id), and the encrypted SKU (Encrypt(SKU,key)). A straightforward example of G( ) may be a concatenation function: G(key_id, SKU_id, license_id, Encrypt(SKU, key))=Concatenate(key_id, SKU_id, license_id, Encrypt (SKU,key)). In such an example, the inverse function G'(X) would be a de-concatenation function: De-Concatenate(X)=key_id, SKU_id, license_id, Encrypt (SKU,key).

Figure 4:
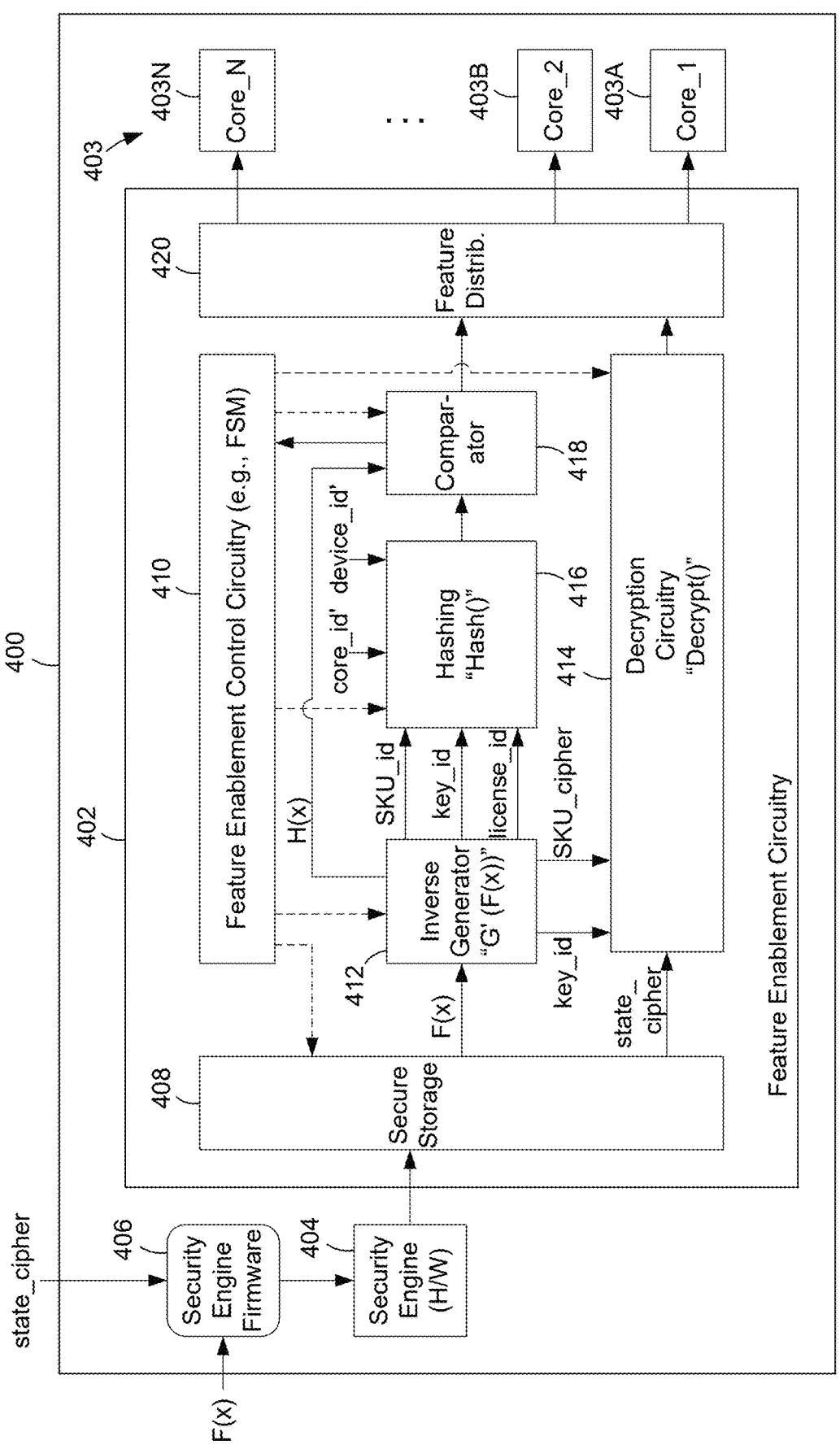
FIG. 4 is a block diagram of feature enablement circuitry in an SoC, in accordance with exemplary embodiments.

In FIG. 4, an SoC 400 may include feature enablement circuitry 402 coupled to core logic circuitry blocks 403, which may comprise a first core logic circuitry block 403A ("Core_1"), a second core logic circuitry block 403B ("Core_2"), etc., through an Nth core logic circuitry block 403N ("Core_N"). The SoC 400 may be an example of the above-described SoC 100 (FIG. 1). Accordingly, the feature enablement circuitry 402 and core logic circuitry blocks 403 may be examples of the above-described (FIG. 1) feature enablement circuitry 104 and core logic circuitry blocks 102, respectively.

The SoC 400 may include security engine firmware 406 and a security engine 404 (i.e., hardware or circuitry that executes or otherwise operates in accordance with the security engine firmware 406). The results or output of the operations described above with regard to FIG. 3, namely, the encrypted configuration information or function F(x), may be saved in the firmware 406. For example, the SoC provider may control this saving of the encrypted configuration information in the firmware 406. The SoC 400 may be provided to an SoC user, such as an OEM, with the encrypted configuration information saved or embedded in the firmware 406.

The security engine 404, which may also be referred to as a trusted management entity (TME), may be an example of the above-described control circuitry 108 (FIG. 1) that may operate during SoC booting. The security engine 404 may perform various tasks during SoC booting, and such tasks may further include loading the encrypted configuration information or function F(x) from the firmware 406 into secure storage 408 (i.e., a memory that may have secure characteristics). Although the secure storage 408 may be used for other purposes in the SoC 400, a portion of the secure storage 408 as shown in FIG. 4 may be used to temporarily store the encrypted configuration information or function F(x) so that it can be accessed by the feature enablement circuitry 402.

Saved in the firmware 406 along with the encrypted configuration information may be additional key-related information that in some examples may be referred to as the "state" or "state information," which may be saved in encrypted form (state_cipher). The state or state information in such examples refers to the initial state of some circuitry, described below, which may be included to further enhance security. The encrypted state (state_cipher) may be provided by encrypting the state using the same encryption algorithm used in the above-described encryption logic 302 (FIG. 3). The security engine 404 may load into the secure storage 408 from the firmware 406 not only the encrypted configuration information or function F(x) but also the encrypted state (state_cipher).

The feature enablement circuitry 402 may include feature enablement control circuitry 410, which may comprise, for example, a finite state machine (FSM). The feature enablement circuitry 402 may further include inverse generator logic circuitry 412, which may perform the inverse function of the above-described generator logic 306 (FIG. 3). The inverse generator logic circuitry 412 operates on the encrypted configuration information (obtained from secure storage 408) and may accordingly be referred to as the function G'(F(x)). The feature enablement circuitry 402 may still further include decryption circuitry 414, hashing circuitry 416, and comparator circuitry 418. Note that the broken-line arrows from the feature enablement circuitry 402 to the secure storage 408, the inverse generator logic circuitry 412, the decryption circuitry 414, the hashing circuitry 416, and the comparator circuitry 418 represent control signals, in response to which those components perform the operations described.

In the illustrated example the inverse generator logic circuitry 412 may be configured to produce from the encrypted configuration information: the key identifier (key_id), the encrypted SKU (SKU_cipher), the SKU identifier (SKU_id), the license identifier (license_id), and a value H(x) that is similar to the above-described output of the hashing logic 304 (FIG. 3). The value H(x) may also be referred to as a programmed hash value. The hashing circuitry 416 may be configured to receive the SKU identifier, the key identifier, and the license identifier from the inverse generator logic circuitry 412. The hashing circuitry

416 may also be configured to receive, as additional inputs, a hard-wired or hard-coded copy of the above-described device identifier (device_id') and a hard-wired or hard-coded copy of the above-described core identifier (core_id'). The hashing circuitry 416 may further be configured to hash the SKU identifier, key identifier, license identifier, hard-coded device identifier, and hard-coded core identifier. The hashing circuitry 416 may provide the result of this hashing operation, which may be referred to as a calculated hash value, to the comparator 418.

The comparator 418 may be configured to compare the result of the hashing operation (i.e., the calculated hash value provided by the hashing circuitry 416) with the above-referenced programmed hash value H(x). If the comparator 418 determines that the calculated hash value matches the programmed hash value, the comparator 418 may provide a positive match indication to the feature enablement control circuitry 410. In response to a positive match indication, the feature enablement control circuitry 410 may signal the decryption circuitry 414 to proceed with the decryption operation. The decryption circuitry 414 may refrain from performing the decryption operation unless it receives such a signal to proceed. If the comparator 418 determines that the calculated hash value does not match the programmed hash value, the comparator 418 may provide a negative match indication to the feature enablement control circuitry 410. In response to a negative match indication, the feature enablement control circuitry 410 may refrain from signaling the decryption circuitry 414 to proceed and may instead indicate an error state to one or more other components. In the error state, feature enablement signals may not be provided to features of the core logic circuitry blocks 403 in the manner described below, and the features may, for example, remain in a default state of disabled or, alternatively in other examples, in a previously configured state.

Figure 5:
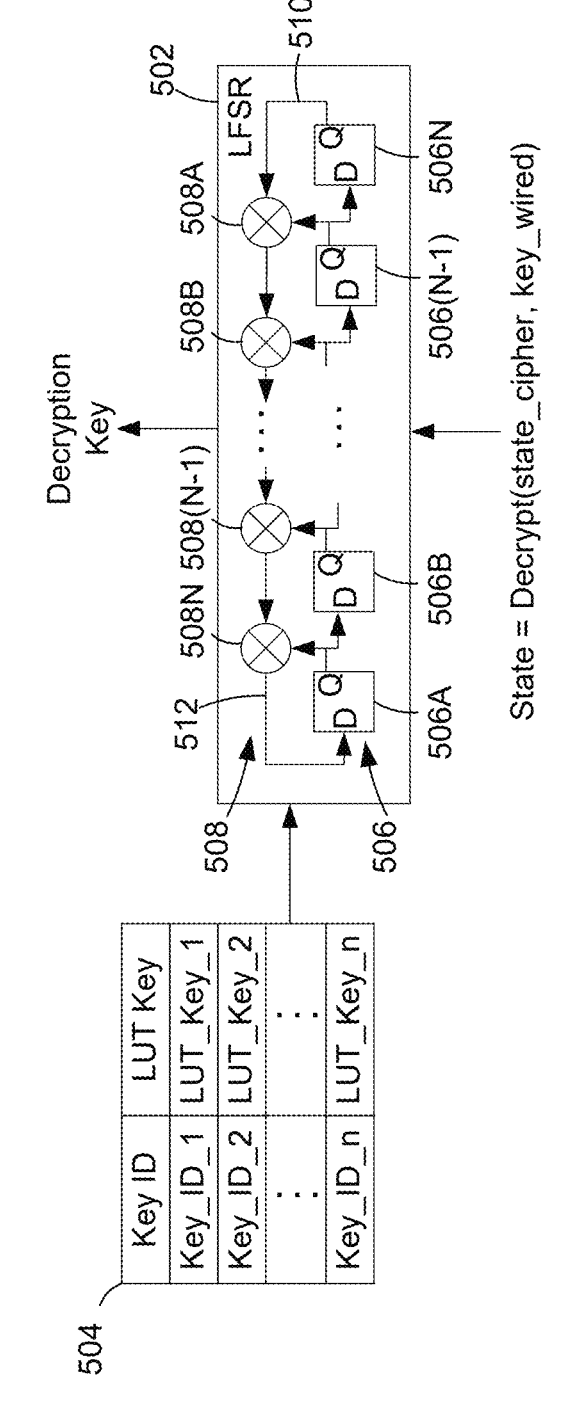
FIG. 5 is a block diagram of decryption key generator circuitry including a variable-tap linear feedback shift register, in accordance with exemplary embodiments.

As shown in FIG. 5, decryption key generator circuitry 500 may include a linear feedback shift register (LFSR) 502 and a lookup table (LUT) 504. The decryption key generator circuitry 500 may be an example of a portion of the above-described decryption circuitry 414 (FIG. 4). Although in other examples the decryption key may be provided in another manner, in the illustrated example the LFSR 502 may be used in providing the decryption key. The LFSR 502 may include a chain of flip-flops 506, such as a first flip-flop 506A, a second flip-flop 506B, etc., through an (N−1)th flip-flop 506 (N−1), and an Nth flip-flop 506N. An output of each flip-flop 506 may be coupled to an input of the next flip-flop 506 in the chain. The LFSR 502 may also include a chain of two-input exclusive-OR (XOR) gates 508, such as a first XOR gate 508A, a second XOR gate 508B, etc., through an (N−1)th XOR gate 508 (N−1), and an Nth XOR gate 508N. An output of each exclusive-OR gate 508 may be coupled to a first input of the next two-input exclusive-OR gate 508 in the chain. The term "feedback" refers to the output 510 of the last flip-flop 506N being coupled to the first input of the first exclusive-OR gate 508A, and the output 512 of the last exclusive-OR gate 508N being coupled to the input of the first flip-flop 506A.

The LFSR 502 may have a number of connections referred to as "taps." A tap is a connection between the output of one of the flip-flops 506 and the second input of one of the two-input exclusive-OR gates 508. The LFSR 502 may be of the variable-tap type. In the variable-tap LFSR 502, connections between outputs of flip-flops 506 and the second inputs of XOR gates 508 are programmable or selectable. For purposes of clarity, the taps are depicted in a conceptual form in FIG. 5. The key identifier (key_id) and the lookup table 504 may be used to program or set the taps of the LFSR 502. The lookup table 504 may comprise a list (Key ID) of the key identifiers and a corresponding list (LUT Key) of LFSR tap settings. For example, a first key identifier ("Key_ID_1") may correspond to a first LFSR tap setting ("LUT_Key_1"), a second key identifier ("Key_ID_2") may correspond to a second LFSR tap setting ("LUT_Key_2"), etc., through an Nth key identifier ("Key_ID_N"), which may correspond to an Nth LFSR tap setting ("LUT_Key_N"). Each of the LFSR tap settings may indicate which taps are in the closed or connected state and which taps are in the open or non-connected state. The lookup table 504 may receive the key identifier (key_id) from the inverse generator logic circuitry 412 and, in response, provide the corresponding tap setting (LUT Key). The LFSR 502 may set its taps based on the tap setting provided by the lookup table 504.

The flip-flops 504 of the LFSR 502 may be set to initial values before the LFSR 502 begins operating. Although not shown in FIG. 5 for purposes of clarity, the LFSR 502 may include additional circuitry configured to load the initial values into the flip-flops 504. The "state" or "state information" referred to above may comprise this set of initial values of the flip-flops 504. The decryption key generator circuitry 500 may receive the state information in encrypted form (state_cipher) from the secure storage 408. The decryption key generator circuitry 500 may produce or recover the state information by performing a decryption operation on the encrypted state information using a hard-wired decryption key, as indicated in FIG. 5: Decrypt (state_cipher, key_wired). Once the state is decrypted, the decryption key generator circuitry 500 may provide the state to the LFSR 502. The LFSR 502 may set the initial states of the flip-flops 506 based on the state information.

Once the LFSR 502 has been initialized with the tap settings and flip-flop initial states as described above, the LFSR 502 may operate to provide a decryption key. That is, after the LFSR 502 has been clocked for a number of cycles (clock signal not shown for purposes of clarity), the flip-flops 504 may contain values that together form the decryption key. Note that this decryption key may be the same key (i.e., have the same value) as the original encryption key ("Key") that the encryption logic 302 (FIG. 3) used to encrypt the SKU offline, except that this decryption key has been generated in the feature enablement circuitry 402 using the LFSR 502.

The decryption circuitry 414 may then use the decryption key provided by the LFSR 502 to decrypt the encrypted SKU (SKU_cipher) provided by the inverse generator logic circuitry 412. It may be noted that, as decrypting the encrypted SKU or configuration information is based on this decryption key, decrypting the encrypted SKU is thus further based on the hard-wired decryption key (key_wired) and the encrypted initial state (state_cipher) of the LFSR 502. Stated another way, decrypting the encrypted SKU or configuration information may be based on a hard-wired key and, in some examples, may be further based on LFSR aspects that are based on the hard-wired key, such as an LFSR initial state.

In the illustrated example, the LFSR 502 may enhance security for reasons including that neither the LFSR 502 nor the hard-wired key can be read by software, an SoC scan chain, etc.; rather, they are securely embedded in the decryption circuitry 414. Nevertheless, it should be understood that in other examples (not shown) a decryption key that may be used to decrypt the encrypted SKU or configuration information may be provided using techniques that do not employ a LFSR.

Referring briefly again to FIG. 4, the decryption circuitry 414 may provide the SKU, as decrypted, to feature distribution circuitry 420. Although not shown for purposes of clarity, the feature distribution circuitry 420 may contain a table indicating which features of which core logic circuitry blocks 403 to enable based on the SKU. The feature distribution circuitry 420 may then provide individual feature enablement signals to core logic circuitry blocks 403 based on the SKU.

In FIG. 6, an exemplary method 600 for decrypting the encrypted information may be an example of a portion of the above-described method 200 (FIG. 2). As indicated by block 602, the method 600 may include providing, based on the encrypted information, a programmed hash value, a configuration identifier (also referred to as a SKU identifier), a user identifier (also referred to as a license identifier), and encrypted configuration information (also referred to as an encrypted SKU). For example, the above-described inverse generator logic circuitry 412 (FIG. 4) may provide these results. As indicated by block 604, the method 600 may also include providing a calculated hash value based on the configuration identifier, the user identifier, and hard-coded SoC identifying information (e.g., device_id', core_id'). For example, the above-described hashing circuitry 416 (FIG. 4) may provide the calculated hash value. As indicated by block 606, the method 600 may further include comparing the calculated hash value with the programmed hash value. As indicated by block 608, the method 600 may still further include decrypting the encrypted information when the calculated hash value matches the programmed hash value. That is, the decryption may not be performed unless the calculated hash value matches the programmed hash value.

Figure 7:
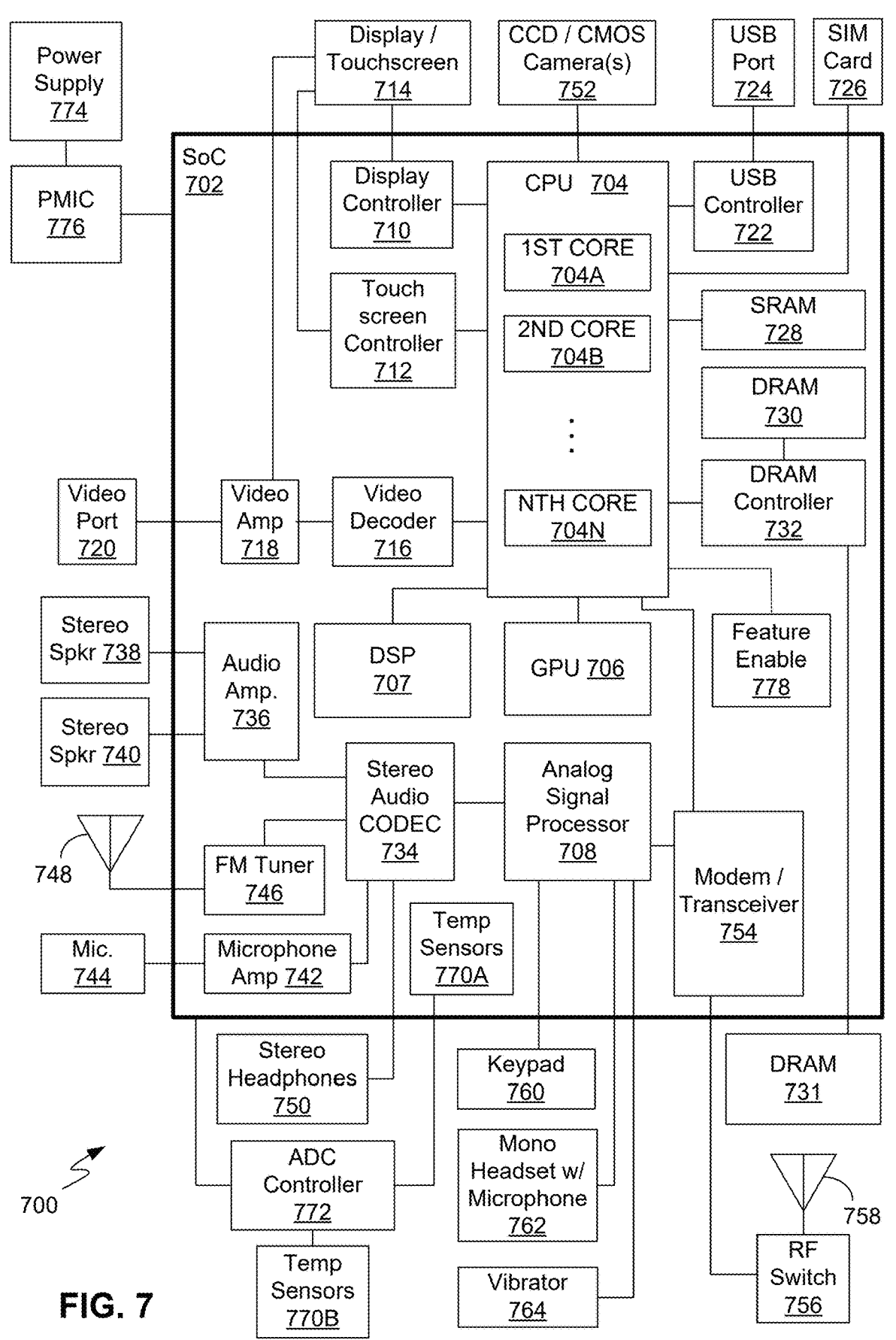
FIG. 7 is a block diagram illustrating a portable computing device having selectably enablable SoC features, in accordance with exemplary embodiments.

FIG. 7 illustrates an example of a portable computing device (PCD) 700, in which exemplary embodiments of systems, methods, and other examples of enabling features of an SoC may be provided. The PCD 700 may be, for example, a cellular telephone or smartphone. For purposes of clarity, some data buses, interconnects, signals, etc., are not shown in FIG. 7.

The PCD 700 may include an SoC 702. The SoC 702 may include a number of processing subsystems, such as a CPU 704, a GPU 706, a digital signal processor (DSP) 707, an analog signal processor 708, a modem/modem subsystem 754, etc. Any or all of these subsystems or other components described below may include one or more features that may be selectably enabled or disabled. The CPU 704 may include one or more CPU cores, such as a first CPU core 704A, a second CPU core 704B, etc., through an Nth CPU core 704N.

A display controller 710 and a touch-screen controller 712 may be coupled to the CPU 704. A touchscreen display 714 external to the SoC 702 may be coupled to the display controller 710 and the touch-screen controller 712. The PCD 700 may further include a video decoder 716 coupled to the CPU 704. A video amplifier 718 may be coupled to the video decoder 716 and the touchscreen display 714. A video port 720 may be coupled to the video amplifier 718. A universal serial bus (USB) controller 722 may also be coupled to CPU 704, and a USB port 724 may be coupled to the USB controller 722. A subscriber identity module (SIM) card 726 may also be coupled to the CPU 704.

The CPU 704 may be coupled to one or more memories, with which the CPU 704 may initiate memory transactions. The one or more memories may include both volatile and non-volatile memories or NVMs. Examples of volatile memories include static random access memory (RAM) 728 and dynamic random access memory (DRAM) 730 and 731.

Such memories may be internal to the SoC 702, as in the case of the DRAM 730, or external to the SoC, as in the case of the DRAM 731. A DRAM controller 732 coupled to the CPU 704 may control the writing of data to, and reading of data from, the DRAMs 730 and 731.

A stereo audio CODEC 734 may be coupled to the analog signal processor 708. Further, an audio amplifier 736 may be coupled to the stereo audio CODEC 734. First and second stereo speakers 738 and 740, respectively, may be coupled to the audio amplifier 736. In addition, a microphone amplifier 742 may be coupled to the stereo audio CODEC 734, and a microphone 744 may be coupled to the microphone amplifier 742. A frequency modulation (FM) radio tuner 746 may be coupled to the stereo audio CODEC 734. An FM antenna 748 may be coupled to the FM radio tuner 746. Further, stereo headphones 750 may be coupled to the stereo audio CODEC 734. Other devices that may be coupled to the CPU 704 include one or more digital (e.g., CCD or CMOS) cameras 752.

The RF transceiver or modem subsystem 754 may be coupled to the analog signal processor 708 and the CPU 704. An RF switch 756 may be coupled to the modem subsystem 754 and an RF antenna 758. In addition, a keypad 760, a mono headset with a microphone 762, and a vibrator device 764 may be coupled to the analog signal processor 708.

The SoC 702 may have one or more internal or on-chip thermal sensors 770A and may be coupled to one or more external or off-chip thermal sensors 770B. An analog-to-digital converter controller 772 may convert voltage drops produced by the thermal sensors 770A and 770B to digital signals. A power supply 774 and a power management integrated circuit (PMIC) 776 may supply power to the SoC 702.

The SoC 702 may include feature enablement circuitry 778. The feature enablement circuitry 778 may be an example of the above-described feature enablement circuitry 104 (FIG. 1) or 402 (FIG. 4). Although not shown for purposes of clarity, the feature enablement circuitry 778 may be coupled to boot control circuitry that may control the loading of encrypted information into the feature enablement circuitry 778. Also not shown for purposes of clarity are enablement signal connections between the feature enablement circuitry 778 and the various processing systems (e.g., cores) or other components of the SoC 702 having selectably enablable features. Nevertheless, the feature enablement circuitry 778 may be configured to enable any selected features of components of the SoC 702 based on encrypted configuration information in the manner described above.

Implementation examples are described in the following numbered clauses.

1. A method for enabling features of a system-on-chip (SoC), comprising:

reading, by control circuitry of the SoC, encrypted information from a memory in the SoC during SoC booting;

providing, by feature enablement circuitry of the SoC, feature enablement signals, wherein providing the feature enablement signals includes decrypting the encrypted information; and providing the feature enablement signals to core logic circuitry of the SoC.

2. The method of clause 1, wherein decrypting the encrypted information comprises:

providing, by inverse generator circuitry, a programmed hash value, a configuration identifier, a user identifier, and encrypted configuration information, based on the encrypted information;

providing, by hashing circuitry, a calculated hash value based on the configuration identifier, the user identifier, and hard-coded SoC identifying information; and comparing the calculated hash value with the programmed hash value; and decrypting the encrypted information when the calculated hash value matches the programmed hash value.

3. The method of clause 2, further comprising:

providing, by the inverse generator circuitry, a key identifier based on the encrypted information;

wherein providing the calculated hash value is further based on the key identifier.

4. The method of clause 3, wherein decrypting the encrypted information comprises:

providing a decryption key using a linear feedback shift register; and decrypting the encrypted information using the decryption key.

5. The method of clause 4, further comprising programming a plurality of taps of the linear feedback shift register based on the key identifier.

6. The method of clause 4, wherein the encrypted information includes encrypted shift register initial values, and decrypting the encrypted information further comprises decrypting the encrypted shift register initial values based on a hard-wired key and loading shift register initial values into the linear feedback shift register.

7. The method of any of clause 6, wherein reading the encrypted information from a memory in the SoC during SoC booting comprises:

loading, by a security engine, the encrypted information from firmware into secure storage in the SoC; and providing a first element of the encrypted information from the secure storage to the inverse generator circuitry, the first element comprising a generated function; and providing a second element of the encrypted information from the secure storage to the decryption circuitry, the second element comprising the encrypted shift register initial values.

8. A system for enabling features of a system-on-chip (SoC), comprising:

control circuitry in the SoC configured to read encrypted information from a memory in the SoC during SoC booting;

feature enablement circuitry in the SoC configured to provide feature enablement signals, wherein the feature enablement circuitry is configured to decrypt the encrypted information, and wherein the feature enablement circuitry is further configured to provide the feature enablement signals to core logic circuitry of the SoC.

9. The system of clause 8, wherein the feature enablement circuitry comprises:

inverse generator circuitry configured to provide a programmed hash value, a configuration identifier, a user identifier, and encrypted configuration information, based on the encrypted information;

hashing circuitry configured to provide a calculated hash value based on the configuration identifier, the user identifier, and hard-coded SoC identifying information; and comparator circuitry configured to compare the calculated hash value with the programmed hash value; and decryption circuitry configured to decrypt the encrypted information when the calculated hash value matches the programmed hash value.

10. The system of clause 9, wherein the inverse generator circuitry is further configured to provide a key identifier based on the encrypted information, and wherein the calculated hash value is further provided based on the key identifier.

11. The system of clause 10, wherein the decryption circuitry includes a linear feedback shift register configured to provide a decryption key, wherein the decryption circuitry is configured to use the decryption key to decrypt the encrypted information.

12. The system of clause 11, wherein the linear feedback shift register has a plurality of programmable taps, and the decryption circuitry is configured to program the taps based on the key identifier.

13. The system of clause 11, wherein the encrypted information includes encrypted shift register initial values, and the decryption circuitry is configured to decrypt the encrypted shift register initial values using a hard-wired key and to load shift register initial values into the linear feedback shift register.

14. The system of clause 13, wherein:

the SoC includes a security engine and firmware, and the security engine is configured to load the encrypted information from the firmware into secure storage of the SoC; and the inverse generator circuitry is configured to receive a first element of the encrypted information from the secure storage, the first element comprising a generated function; and the decryption circuitry is configured to receive a second element of the encrypted information from the secure storage, the second element comprising the encrypted shift register initial values.

15. A system for enabling features of a system-on-chip (SoC), comprising:

means for reading encrypted information from a memory in the SoC during SoC booting;

means for providing feature enablement signals, wherein providing the feature enablement signals includes decrypting the encrypted information; and means for providing the feature enablement signals to core logic circuitry.

16. The system of clause 15, wherein the means for decrypting the encrypted information comprises:

means for providing a programmed hash value, a configuration identifier, a user identifier, and encrypted configuration information, based on the encrypted information;

means for providing a calculated hash value based on the configuration identifier, the user identifier, and hard-coded SoC identifying information; and means for comparing the calculated hash value with the programmed hash value; and means for decrypting the encrypted information when the calculated hash value matches the programmed hash value.

17. The system of clause 16, further comprising:

means for providing a key identifier based on the encrypted information;

wherein the means for providing the calculated hash value provides the hash value further based on the key identifier.

18. The system of clause 17, wherein the means for decrypting the encrypted information comprises:

means for providing a decryption key; and means for decrypting the encrypted information using the decryption key.

19. The system of clause 18, further comprising means for programming the means for providing the decryption key based on the key identifier.

20. The system of clause 18, wherein the encrypted information includes encrypted initial values, and the means for decrypting the encrypted information further comprises means for decrypting the encrypted initial values and means for loading initial values into the means for providing the decryption key.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for enabling features of a system-on-chip (SoC), comprising:

reading, by control circuitry of the SoC, encrypted information from a memory in the SoC during SoC booting;

providing, by feature enablement circuitry of the SoC, feature enablement signals, wherein providing the feature enablement signals includes decrypting the encrypted information; and providing the feature enablement signals to core logic circuitry of the SoC;

wherein decrypting the encrypted information comprises:

providing, by inverse generator circuitry, a programmed hash value, a configuration identifier, a user identifier, and encrypted configuration information, based on the encrypted information;

providing, by hashing circuitry, a calculated hash value based on the configuration identifier, the user identifier, and hard-coded SoC identifying information; and comparing, by comparator circuitry, the calculated hash value with the programmed hash value; and decrypting, by decryption circuitry, the encrypted information when the calculated hash value matches the programmed hash value, wherein the decryption circuitry includes a linear feedback shift register configured to provide a decryption key.

2. The method of claim 1, further comprising:

providing, by the inverse generator circuitry, a key identifier based on the encrypted information;

wherein providing the calculated hash value is further based on the key identifier.

3. The method of claim 2, wherein decrypting the encrypted information comprises:

providing a decryption key using the linear feedback shift register; and decrypting the encrypted information using the decryption key.

4. The method of claim 3, further comprising programming a plurality of taps of the linear feedback shift register based on the key identifier.

5. The method of claim 3, wherein the encrypted information includes encrypted shift register initial values, and decrypting the encrypted information further comprises decrypting the encrypted shift register initial values based on a hard-wired key and loading shift register initial values into the linear feedback shift register.

6. The method of claim 5, wherein reading the encrypted information from a memory in the SoC during SoC booting comprises:

loading, by a security engine, the encrypted information from firmware into secure storage in the SoC; and providing a first element of the encrypted information from the secure storage to the inverse generator circuitry, the first element comprising a generated function; and providing a second element of the encrypted information from the secure storage to the decryption circuitry, the second element comprising the encrypted shift register initial values.

7. A system for enabling features of a system-on-chip (SoC), comprising:

control circuitry in the SoC configured to read encrypted information from a memory in the SoC during SoC booting;

feature enablement circuitry in the SoC configured to provide feature enablement signals, wherein the feature enablement circuitry is configured to decrypt the encrypted information, and wherein the feature enablement circuitry is further configured to provide the feature enablement signals to core logic circuitry of the SoC, the feature enablement circuitry comprising:

inverse generator circuitry configured to provide a programmed hash value, a configuration identifier, a user identifier, and encrypted configuration information, based on the encrypted information;

hashing circuitry configured to provide a calculated hash value based on the configuration identifier, the user identifier, and hard-coded SoC identifying information; and comparator circuitry configured to compare the calculated hash value with the programmed hash value; and decryption circuitry configured to decrypt the encrypted information when the calculated hash value matches the programmed hash value, wherein the decryption circuitry includes a linear feedback shift register configured to provide a decryption key.

8. The system of claim 7, wherein the inverse generator circuitry is further configured to provide a key identifier based on the encrypted information, and wherein the calculated hash value is further provided based on the key identifier.

9. The system of claim 8, wherein the decryption circuitry is configured to use the decryption key to decrypt the encrypted information.

10. The system of claim 9, wherein the linear feedback shift register has a plurality of programmable taps, and the decryption circuitry is configured to program the taps based on the key identifier.

11. The system of claim 9, wherein the encrypted information includes encrypted shift register initial values, and the decryption circuitry is configured to decrypt the encrypted shift register initial values using a hard-wired key and to load shift register initial values into the linear feedback shift register.

12. The system of claim 11, wherein:

the control circuitry includes a security engine and firmware, and the security engine is configured to load the encrypted information from the firmware into secure storage of the SoC; and the inverse generator circuitry is configured to receive a first element of the encrypted information from the secure storage, the first element comprising a generated function; and the decryption circuitry is configured to receive a second element of the encrypted information from the secure storage, the second element comprising the encrypted shift register initial values.

* * * * *